Apr. 3, 1923. 1,450,381.
H. C. MIEVILLE.
GRILL.
FILED FEB. 14, 1921. 2 SHEETS—SHEET 1.
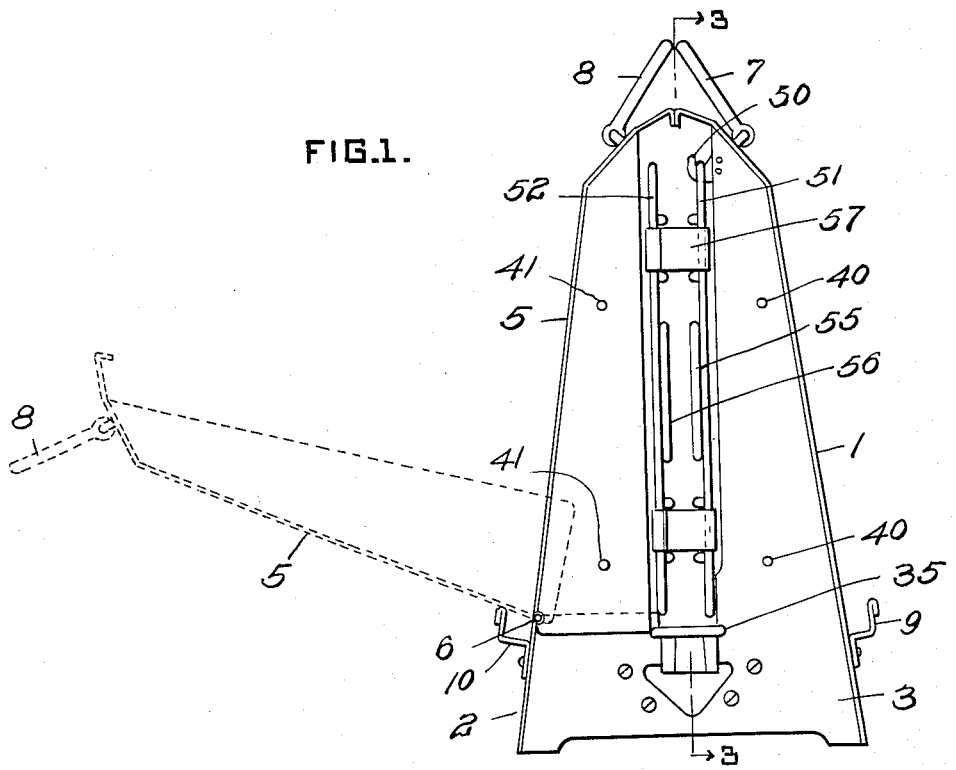
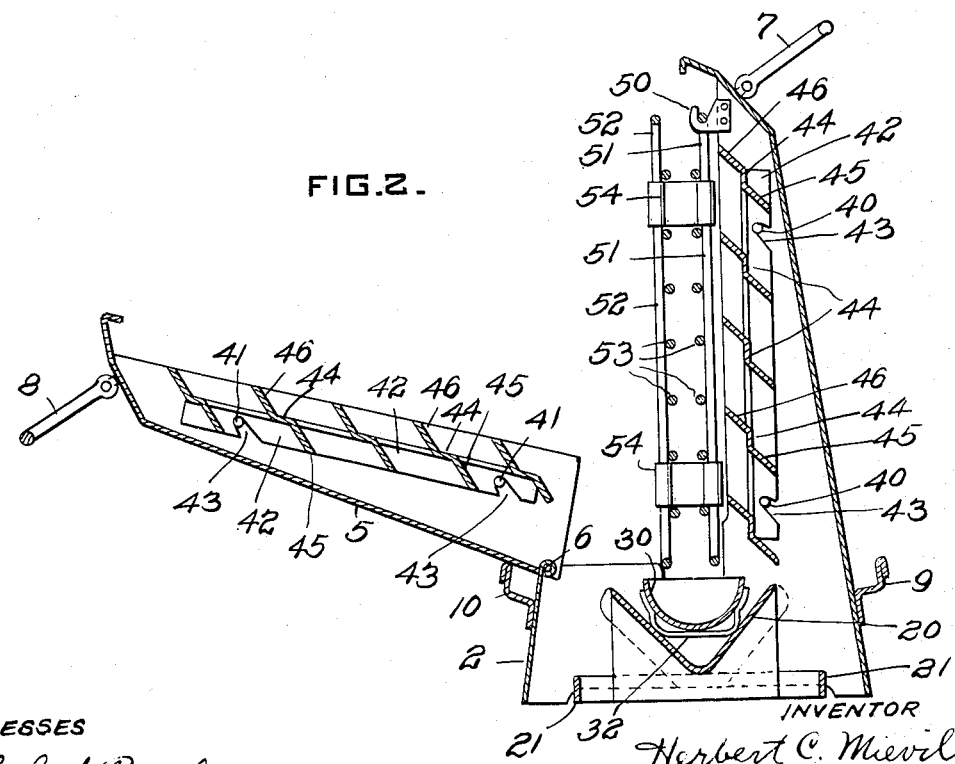

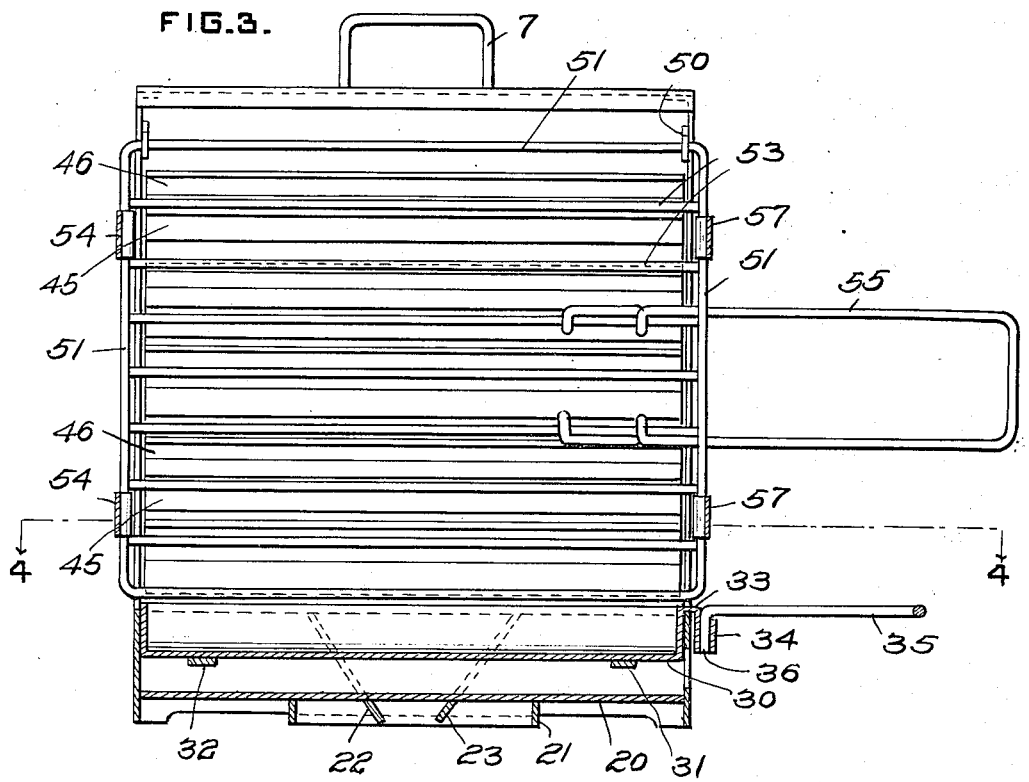
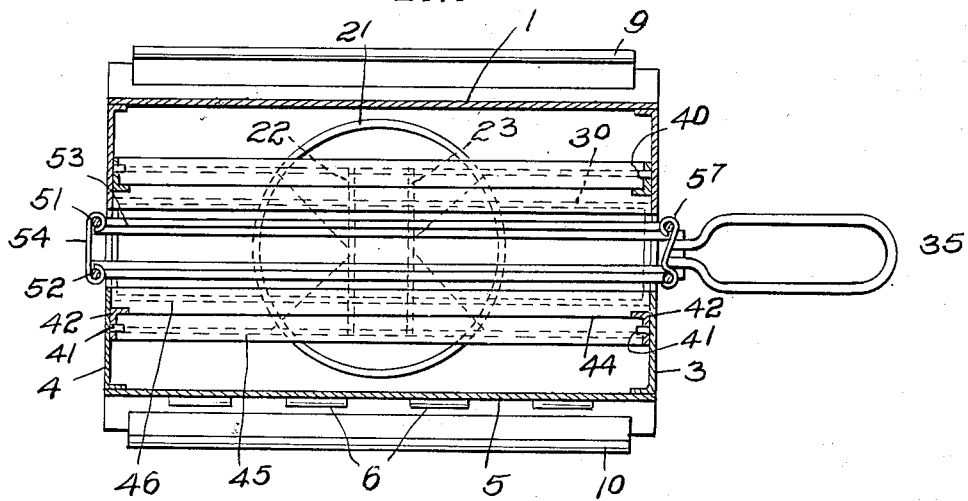

Patented Apr. 3, 1923.

1,450,381

UNITED STATES PATENT OFFICE.

HERBERT C. MIEVILLE, OF DAVENPORT, IOWA, ASSIGNOR TO SQUIRE PRODUCTS COMPANY, OF PITTSBURGH, PENNSYLVANIA, A CORPORATION OF DELAWARE.

GRILL.

Application filed February 14, 1921. Serial No. 444,721.

*To all whom it may concern:*

Be it known that I, HERBERT C. MIEVILLE, a subject of the King of England, at present a resident of Davenport, in the county of Scott and State of Iowa, have invented a new and useful Improvement in Grills, of which the following is a specification.

This invention relates to cooking utensils. More particularly it relates to a device for broiling meats. And especially it relates to apparatus of the class referred to comprising a broiler that may be set over an open gas burner, holding the food being cooked edgewise, and exposed on both sides to heated gases. Other objects of the invention are to provide such a device that is portable, which may be easily cleaned, which will suspend the food in such position as to receive a uniform application of heat, simultaneously on both sides, and which will cause heat from a burner to be effectively applied directly to the food being cooked. Further uses and advantages of the invention will appear throughout the following specification.

Referring to the drawings Fig. 1 is an end elevation of the device; Fig. 2 is a transverse vertical section through the device with the door open; Fig. 3 is a longitudinal central vertical section on the line 3—3 of Fig. 1; and Fig. 4 is a horizontal section on the line 4—4, of Fig. 3.

Meats, such as steaks, chops, fish, and the like are broiled by exposing them to the heat of a fire, or flame. This is ordinarily done either by suspending the meat over a fire or other source of heat, in which case the juices that are given off by the meat during cooking fall into the fire and are lost, or else by suspending the meat under a gas flame, with a pan under the meat to catch the drippings therefrom. Each method is wasteful, either of the food itself, or of the heat applied. And in either case the heat is applied only to one side of the meat at a time, therefore requiring extra time for cooking as well as the trouble of turning, with a consequent loss of fuel. There are other objections well known to those familiar with this art.

The present invention avoids all of these objections, and provides in a compact form a broiler which will hold steaks, chops, fish, toast, or the like, in such position as to derive the full benefit from the fuel used, and which will uniformly cook meat simultaneously on both sides while at the same time saving all of the drippings. In addition it is portable, may be economically manufactured from sheet metal, is easily cleaned, and entirely sanitary.

The grill, or broiler, which is the subject matter of this invention comprises a main casing of sheet metal, having side walls 1 and 2, and end walls 3 and 4. The side wall 2 is integral with the ends, and side wall 1 has its upper portion formed into a door-like member 5, which is attached to the body of the device by a hinge 6 running the length of the side walls. Handles 7 and 8 are attached to the tops of the wall 1 and door 5, respectively. These handles are mounted with a swivel connection, so that normally they stand out at 45° to the casing, but so that they can be raised to parallel position in contact with each other, forming in effect a single handle for lifting and carrying the broiler. The normal position of the handles prevents their becoming too hot. Riveted to the side walls 1 and 2, and parallel to the bottom thereof, are sheet metal bracket members 9 and 10, extending across the side walls. These brackets form a plate rack when the broiler is closed, and the bracket 10 forms a support for the door 5 when it is in open position as shown in Figs 1 and 2.

It will be observed that the casing formed by the sheet metal wall referred to is broad at its base and the side walls taper towards each other at the top. The end walls are parallel.

Riveted to the inside of the end walls and extending from end to end is a V-shaped trough member 20. Welded onto the bottom of the trough member 20, at its middle portion, is a metal ring 21, adapted to fit into the ordinary hole of a gas stove, over the usual burner. Two inwardly inclined baffle members 22 and 23 are likewise welded to the bottom of the trough 20. These are positioned within the ring 21. Their incline is outward and upward away from the center of said ring, as clearly illustrated in Fig. 3. These baffle members have a V-shaped portion cut out in their middle upper edges and this fits over the bottom of the V-shaped trough and may be readily welded thereto.

A removable receptacle or pan 30 is adapted to seat in the trough 20. This pan has two metal strips 31 and 32 welded on its bottom, and these strips are adapted to seat on the inclined inner walls of the trough member 20, and to space the pan away from the trough, as clearly shown in Fig. 2.

At one end of the receptacle 30 is provided an extension 33. This extends over the edge of the end wall 3, and then downward parallel thereto, and this outward extension has a strap member 34 welded thereto, forming a downwardly divergent opening adapted to receive a spring wire handle 35, so that the pan 30 may be lifted out of the broiler when desired. The handle 35 is made of spring wire, the ends of which are normally somewhat divergent, but which may be brought together by pressure of the handle, until the downwardly projecting portions 36 are in contact at their upper ends when they may be readily inserted in the opening between the projection 33 and strap 34. Thereupon the release of pressure upon the handle results in the terminals 36 being forced apart until they engage the side walls of the opening formed by straps 34 and furnish a resilient engagement therewith, permitting the readily lifting out of the pan 30, as will be obvious. The downwardly turned ends 36 are also turned outward so as to grip the strap 34 securely.

Two sets of pins 40 are riveted into the fixed end walls 3 and 4 as illustrated. Corresponding pins 41 are riveted into the end walls attached to the door member 5. Two baffle members are adapted to seat upon and be carried by the sets of pins 40 and 41, respectively. These baffle members comprise vertical upright sheet metal members 42, having in their sides a pair of inclined notches 43, adapted to cooperate with the pins 40 to support the baffle members, as clearly illustrated in Fig. 2. Welded to the uprights 42 which are in pairs, one situated at each end of the broiler, are a series of transverse baffle plates 44. These are similar, and comprise sheet metal plates having an outer inclined portion 45, and inner inclined portion 46, the intermediate vertical portion being welded to the upright member 42. It will be observed that each of these baffles is inclined upwardly and inwardly relative to the side walls of the broiler. An exactly similar baffle is adapted to be mounted on the pins 41 of the door member 5. These baffle members are readily removed from the broiler by simply raising them off their supporting pins.

Riveted to the end walls of the shell, on the side opposite the door member 4, are two hooks 50. The end walls are cut away in the middle, that is to say, along the central vertical plane through the device, so as to form two vertical openings above the pan 30. The hooks 50 extend out from the end walls into this opening.

The hooks 50 are adapted to support a grill composed of two ordinary grid-members. These consist of wire loops 51 and 52, having parallel bars 53 extending thereacross, in the well known manner. The two loops are connected at one end by hinge loops or links 54, which may be of any desired length according to the thickness of the meat that is to be supported by the grill. At the other end two of the bars 53 are extended beyond the loops, to form supplementary loops 55 and 56. These are used as a handle for the grill. Instead of having the handles 55 and 56 extended loops, they may be made of separate wires having their ends turned round two of the grid bars, and this permits them to be pushed in and out, saving space in packing. Latch members 57 are provided connecting the open ends of the grill loops, and for holding them at a distance apart equal to the space provided by the hinged loops 54, as is well known in such structures.

The operation of the device is as follows: The broiler is set over an ordinary gas stove burner, or some similar source of heat, the ring 21 extending into the stove hole, or else being positioned concentric with the burner. The meat to be cooked, such as a steak, is placed between the grill members 51 and 52, and is securely held therein by closing the latch members 57. Thus the meat is spread out between the two members of the grill, and is exposed on both sides. The door 5 of the broiler is opened, coming to rest in the position shown in Fig. 2. The grill is then supported within the broiler by hanging the upper side of one of the loops on the hooks 50. The lower side of the loop bears against the edges of the end walls, and the grill hangs in a vertical position. Then the door 5 is closed.

Heat from the burner passes upward into the shell of the broiler, and this heat is deflected outwardly towards the side walls of the broiler by the V-shaped trough member 20. At the same time it is deflected towards the end walls of the broiler by means of the inclined baffle members 22 and 23. It is also deflected towards the ends by the fact that the hot air in order to escape must pass through the opening in the end walls of the broiler, the side walls being completely closed. This causes a substantially uniform distribution of the heated air from the burner along the entire interior walls of the broiler. The heat in passing upward is caught by the baffle members 44 which carry it inward, and cause it to pass over the surface of the food supported by the grill.

Since the heat is first deflected outward against the side walls, and also deflected towards the ends thereof, it passes upward along the inside side walls uniformly. It will be observed that the space between the inclined side walls and the baffle members 44 is greater at the bottom where the heat is more intense, and less at the top where the heat is naturally less. Consequently more of the heated air is caught at the top than at the bottom and results in a uniform application of the heat to the food at the top and bottom and from end to end of the broiler. This secures a uniform cooking of the meat simultaneously and equally on both sides, and substantially equally at the lower and upper edges thereof. However, because of the fact that there is somewhat more heat applied at the bottom, that portion of food may cook slightly more rapidly than the upper. When such is the case, it is only necessary to open the door, turn the grill over, and hook the other edge on the supports 50. Then when the door is closed the previously upper side will be lowermost, and further cooking will render the food symmetrically cooked throughout.

The drippings from meat during cooking are all caught by the receptacle 30, which is supported directly under the meat, and which extends from end to end of the broiler. This may be removed readily and emptied by means of the detachable handle 35. The supporting straps 32 space this gravy pan 30 away from the V-shaped trough member 20, which prevents the overheating of the latter. An asbestos member may also be used as a liner for the trough 20, if desired. A certain amount of water may be placed in the gravy pan 30 before commencing cooking. This water will be partly evaporated in the cooking process, and will aid in the production of a gravy of the desired consistency.

I claim:

1. A broiler comprising a sheet metal casing adapted to seat over a burner, the walls of said casing tapering towards each other from the base, means to support a vertically disposed grill intermediate the walls of the broiler, baffle members positioned inside the broiler and adapted to cause heat from the burner to be directed against the said grill.

2. A broiler comprising a sheet metal shell, a door on one side, a grill adapted to hang in vertical position inside the broiler, and inwardly and upwardly inclined baffle members positioned parallel with the grill and on each side thereof.

3. A broiler comprising a sheet metal shell open at its base, baffle members adapted to deflect heat passing into the bottom of the broiler against the side walls thereof and other baffle members adapted to deflect heat passing along the upper sides of the broiler inward towards the middle plane thereof, and a meat supporting grill adapted to hang vertically in the middle plane of the broiler.

4. A device for cooking comprising a sheet metal casing having one side hinged so that it will open at the top, a longitudinal baffle member extending from end to end thereof and positioned at the bottom thereof, other baffle members positioned at the middle portion thereof and extending upward and away from the middle portion thereby to deflect heat to the end walls of the casing, a receptacle extending from end to end of the casing and protected from heat by means of the longitudinal baffle, means to deflect heat from the side walls of the casing towards the middle plane thereof, and means to support the food to be cooked in the middle portion of the casing.

5. A cooking utensil comprising a casing open at its bottom and having side walls convergent towards each other at the top, a longitudinal V-shaped baffle member extending from end to end of the casing near its bottom, means to support a grill in vertical position above the said longitudinal baffle, and removable baffle members adapted to deflect heated air passing upward through the casing inward against the said grill.

6. A cooking utensil comprising a sheet metal shell adapted to seat over a stove or burner, said shell being open at its bottom, baffles adapted to deflect heat passing into the shell towards the walls and ends thereof, other baffle members positioned in the casing and adapted to deflect the heated air passing upward transversely towards the middle portion thereof, and a food supporting grill adapted to hang in the casing in vertical position and substantially in the middle plane of the casing.

7. A cooking utensil comprising a sheet metal shell adapted to seat over a stove or burner, said shell being open at its bottom, baffles adapted to deflect heat passing into the shell towards the walls and ends thereof, a grill adapted to hang vertically in the shell, said shell having narrow vertical openings extending from its top towards the bottom thereof in the middle portions of each end.

8. A broiler comprising a sheet metal shell, a door on one side, a grill adapted to hang in vertical position inside the broiler, baffle members adapted to deflect heated air received in the bottom of the broiler towards the ends thereof, the ends of the broiler having narrow vertical openings extending from the top thereof towards the bottom in their middle portions.

In testimony whereof, I have hereunto set my hand.

HERBERT C. MIEVILLE.

Witnesses:
Jo BAILY BROUS,
EDWIN O. JOHNS.